WATER PURIFICATION COAGULATION APPARATUS WITH PERFORATE PLATE FLOW CONTROLLERS
Filed Aug. 22, 1955
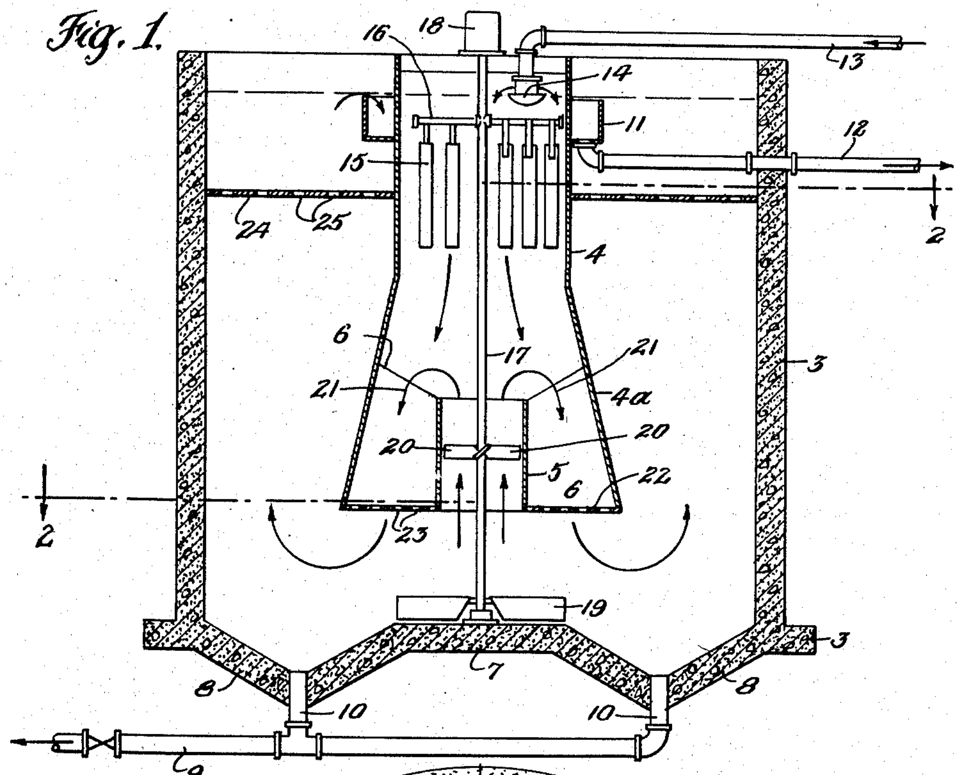
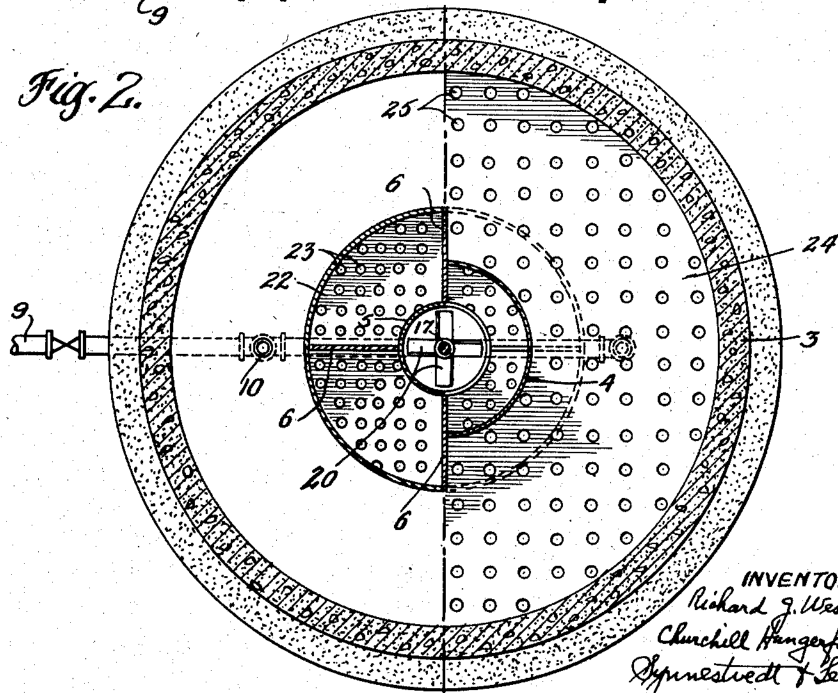
INVENTORS
Richard G. Weston
Churchill Hungerford Jr.
Synnestvedt & Lechner
ATTORNEYS United States Patent Office 2,891,008
Patented June 16, 1959

2,891,008

WATER PURIFICATION COAGULATION APPARATUS WITH PERFORATE PLATE FLOW CONTROLLERS

Richard G. Weston, Philadelphia, Pa., and Churchill Hungerford, Jr., Wenonah, N.J., assignors to Hungerford & Terry, Inc., Clayton, N.J., a corporation of Delaware Application August 22, 1955, Serial No. 529,677

1 Claim. (Cl. 210—208)

This invention relates to the art of water purification and particularly to that type of purification which is known as the coagulation method wherein the water is treated with coagulating chemicals for the purpose of producing an agglomeration or flocculation of the impurities. The treatment is conducted in suitable sedimentation basins so that the agglomerated or flocculated mass known as the "floc" can be separated from the clear water and removed as a sludge. Various forms of equipment for this purpose are familiar to those skilled in the art and our invention is particularly adapted for use in connection with upflow sedimentation basins which comprise a central downcomer mixing or agglomerating section which is surrounded by an upcomer or settling section with the two sections in communication near the bottom. The floor of the device constitutes what is known as a platform for the floc and this is generally configured to provide what is known as a sludge hopper from the low point of which the flocculated material can be withdrawn through a suitable de-sludging line. In addition, equipment of the character under consideration includes a raw water inlet near the top of the central downcomer or mixing section, some sort of mechanical agitating means for thoroughly mixing the coagulant with the water and a clear water take-off flume near the top of the surrounding settling section. The chemicals which effect the coagulation may be introduced into the raw water pipe or into the top of the central mixing section.

As indicated, our invention is particularly applicable to systems of the kind which is above described and the principal objects of the invention may be said to reside in the provision of a method and equipment which will greatly increase the dependability of installations for the purification of water by coagulation by preventing short-circuiting of the water through the sludge or settling zone and eliminating carry-over of large quantities of precipitated matter or floc into the clear water collecting flume. Heretofore, this carry-over of precipitated floc has frequently been substantial and has resulted in a high degree of turbidity in the effluent. With our invention, such turbidity is almost completely eliminated regardless of fluctuation in the demand for clear water unless, of course, the demand so far exceeds the rated capacity of any given unit as to destroy its functioning completely. In situations of this kind the only thing that can be done is to increase the capacity of the unit or install additional units.

More particularly stated, it is an object of our invention to provide equipment of the character described which includes means for slightly retarding the movement of the water so that the total flow volume is distributed substantially evenly over the cross-sectional area of the settling basin, thereby assuring full mixing time in the central or agglomerating section and an even flow of water into the settling section. In connection with this object, we also provide for such retardation of the flow without in any way developing what is known as "jet" action because we have found that far better results are attained if jet action is eliminated.

Another object of our invention is to provide a structure by means of which the freshly formed particles of floc are brought into intimate contact with one another so that they immediately start to grow into larger masses and tend to produce a tougher and heavier precipitate.

Still further, our invention has in view the provision of a method and equipment for decreasing the retention period required in the settling region of the coagulator which, in turn, enables use to reduce the overall size of the equipment and at the same time contributes to economy of original installation as well as of maintenance.

Another object of our invention involves the provision of equipment by means of which an installation can be operated at well below its rated capacity and then suddenly be stepped up to its full capacity without causing the slightest disturbance to or impairment of the uniform character of the purified water. This is a marked improvement over what has been possible with previous equipment because, heretofore, under the conditions mentioned, namely, very low demand to high demand, marked disturbance or impairment of the clarity of the treated water has generally been accepted as an unfortunate necessity, at least for a short time afterwards.

How the foregoing objects and advantages are attained is illustrated in preferred form in the accompanying drawing wherein Figure 1 is a vertical longitudinal section through equipment suitable for our invention and Figure 2 is a horizontal section taken approximately as indicated by the line 2—2 in Figure 1.

As will be seen from the drawings, our equipment comprises an outer upcomer or settling section 3 within which is arranged, preferably concentrically, a downcomer mixing or agglomerating section 4 which is flared slightly outwardly from approximately its mid-section to its lower end, as indicated by the reference character *4a*. This flaring should begin at a level above the top of the tube 5 and continue down and around the tube to terminate at a level approximately opposite the bottom of the tube as shown. Within the lower portion of the flared section *4a*, we provide an inner sludge recirculation tube 5 which is supported concentrically of the downcomer by means of suitable vertical plates 6 which serve also to divide the interior of the flared portion *4a* into a plurality of vertical passageways, the number of which depends, of course, upon the number of vertical plates 6 which are employed.

The bottom of the settling basin or section 3 is formed with a central floor or platform area 7 surrounded by an annular sludge hopper or trough 8, the low point of which latter is suitably connected to a valve controlled de-sludging line 9 through connections such as the vertically extending pipes 10.

Near the top of the equipment is a clear water removal flume 11, from the bottom of which the purified water is withdrawn through the delivery pipe 12.

The raw water to be treated comes in through the pipe 13 which delivers into the top of the downcomer section 4, there being a suitable distributing head 14 at the point of delivery which serves to break up the flow and spread it more uniformly over the upper portion of the downcomer.

The coagulating chemicals may in whole or in part be introduced with the raw water or added at the top of the downcomer in advance of the agitating paddles 15. These paddles are mounted upon horizontal arms 16 carried by a central operating shaft 17 which extends downwardly from an actuating motor 18 to the floor or platform 7. At the bottom the shaft 17 also carries scraper arms 19 which serve the purpose of keeping the platform directly below the downcomer clear of any heavy coagulated matter by forcing the same over into the sludge hopper 8.

Within the inner sludge re-circulating tube we provide additional blades 20 having a pitch which is set to drive against the downcoming flow of the treated water for the purpose of effecting partial recirculation thereof upwardly against the down-flow, the action being such as to cause circulation of the treated water in the manner and direction indicated by the arrows 21.

As shown, all three of the agitating means, namely, the paddles 15, the sludge scrapers 19 and the re-circulating blades 20 are mounted upon the common operating shaft 17 which is actuated by the single operating motor 18.

At the lower end of the downcomer section 4—**4*a*, and extending inwardly from the perimeter of the flared portion 4*a* over to the perimeter of the inner lower re-circulation tube, we provide what we have termed a horizontal muffle platform or plate 22. This muffle plate is pierced with a plurality of uniformly arranged openings 23**, each of which is preferably of exactly the same size or area for the purposes which will appear below.

Another muffle platform or plate 24 is provided in the upper region of the settling zone above the level of any usual or normal rise of the floc zone. This muffle surrounds the downcomer 4 and extends outwardly therefrom to the walls of the upcomer 3 at a point slightly below the level of the flume 11. This muffle is provided with a plurality of openings 25, of substantially uniform arrangement and size as in the case of the openings 23 in the muffle 22. However, the total area of the openings 25 must be substantially equal to the total area of the openings 23 so that substantially equal flow can take place through the two muffles.

At the rated capacity of the unit the total area of the openings in the two muffle plates should be such as to yield a speed of flow through the openings of approximately 12 feet per minute. In other words, in normal operation when the unit is being used at substantially its full rated capacity, the openings in the two muffle plates must be so designed in relation to the capacity as to result in the specified 12 feet per minute. In this connection it might be noted that the muffle plates introduce a slight retarding action on the flow through the unit which retarding effect is responsible for the uniform distribution of the flow over the entire area of each of the plates. It should also be noted, however, that we have so designed these relationships as to prevent or eliminate anything of a nature which might be called "jet" action and also so that the loss of head across the muffle platforms is very small indeed.

Of course, there are times when demand may be less than the rated capacity of the unit and other times when a certain over-load or increase above rated capacity may be necessary. Of the two conditions, over-load, of course, is the more troublesome and, ordinarily, a unit should not be pushed beyond approximately twenty-five percent (25%) over-load and this for relatively short periods. Long continued over-load would, of course, upset the balance of the unit and the floc would tend to build up and pass through the openings 25 and the baffle 24. On the other hand, should the demand be considerably less than capacity, the velocity through the openings would be too small whereupon the value of the muffle platforms as a means for retarding the flow and providing for even distribution throughout the available area would be somewhat impaired.

After much experience, we have finally determined that the equipment should be designed so as to produce a velocity of flow of 12 feet per minute through the openings when operating at rated capacity.

It might also be noted that extreme variations in water temperature are also an influencing factor which lead to disturbances similar to those which are produced by wide variations in demand. However, this problem does not enter the picture frequently enough to be of major importance.

The reverse sweep which takes place in the inner sludge re-circulation tube of the agglomerating section by virtue of the impeller blades 20, is designed to turn the flow of the water back on itself with sufficient velocity to prevent substantially all downward flow through this inner tube and to force the flow to take place through the flared portion **4*a* of the downcomer, as indicated by the arrows 21**. The effect of this is to create a rolling action which re-circulates previously formed but only partly built up floc particles so that they can meet with other particles and thereby increase their growth and size.

It is obvious that our invention will yield many advantages in operation, such as substantial uniformity in the clarity of the treated water and this at a minimum of expense for coagulating chemicals because of the efficiency with which the chemicals are utilized. It also makes it possible to reduce the size of the equipment for a given capacity and, therefore, decreases both installation and maintenance costs. Furthermore, the over-all height of a unit of this kind can be kept relatively low which is often a very important feature where available installation space is at a minimum. In addition, sudden surges in demand do not present the problem heretofore encountered with previous equipment, where such surges often caused what are known as "boils" which tend to carry over great quantities of precipitated matter or floc into the collection flume with a consequent increase in the turbidity of the effluent. Our improvements completely eliminate this difficulty even during periods of as much as a twenty-five percent (25%) over-load provided, of course, that such periods of over-load are not of excessive duration.

We claim:

In water-treating equipment, a coagulator having a downcomer into the top of which the raw water and the coagulant are delivered, a settling basin surrounding the downcomer, an open-ended recirculation tube within the lower portion of the downcomer, a perforated plate extending between the outer wall of the recirculation tube and the inner wall of the downcomer, said plate affording communication between the lower portion of the downcomer and the lower portion of the settling basin, an impeller means in the recirculation tube adapted to reverse the flow of the downcoming stream within the tube, a perforated plate near the top of the settling basin, and a clear water removal means above said last plate, the total flow area presented by the openings in one plate being substantially the same as in the other plate with the openings in each plate being of substantially the same size and uniformly arranged in the plate whereby the flow is distributed substantially uniformly over the cross sectional area of the settling basin.

References Cited in the file of this patent

UNITED STATES PATENTS

| | | |
|---|---|---|
| 963,448 | Linden | July 5, 1910 |
| 2,245,588 | Hughes | June 17, 1941 |
| 2,245,589 | Hughes | June 17, 1941 |
| 2,483,706 | Lind | Oct. 4, 1949 |
| 2,777,581 | Unthank | Jan. 15, 1957 |

FOREIGN PATENTS

| | | |
|---|---|---|
| 140,135 | Australia | Feb. 2, 1951 |